(12) United States Patent
Chabanne et al.

(10) Patent No.: US 8,755,543 B2
(45) Date of Patent: Jun. 17, 2014

(54) TECHNIQUES FOR LOCALIZED PERCEPTUAL AUDIO

(71) Applicant: Dolby Laboratories Licensing Corporation, San Francisco, CA (US)

(72) Inventors: Christophe Chabanne, Carpentras (FR); Charles Q. Robinson, Piedmont, CA (US); Nicolas R. Tsingos, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/892,507

(22) Filed: May 13, 2013

(65) Prior Publication Data

US 2013/0251177 A1 Sep. 26, 2013

Related U.S. Application Data

(63) Continuation of application No. 13/425,249, filed on Mar. 20, 2012, which is a continuation of application No. PCT/US2011/028783, filed on Mar. 17, 2011.

(60) Provisional application No. 61/316,579, filed on Mar. 23, 2010.

(51) Int. Cl.
*H04R 5/02* (2006.01)

(52) U.S. Cl.
USPC ............................ 381/306; 381/333; 381/388

(58) Field of Classification Search
CPC ........... H04N 5/642; H04N 3/12; H04N 5/02; H04N 2499/15; H04S 7/00; H04S 2400/11; G06F 1/1605

USPC ............... 381/306, 333, 388, 310, 61; 463/35
See application file for complete search history.

(56) References Cited

U.S. PATENT DOCUMENTS

| 1,124,580 A | 1/1915 | Amet |
| 1,793,772 A | 2/1931 | Bouma |

(Continued)

FOREIGN PATENT DOCUMENTS

| EP | 1035732 | 9/2000 |
| GB | 394325 | 6/1933 |

(Continued)

OTHER PUBLICATIONS

Davis, Mark F., "History of Spatial Coding", J. Audio Eng. Soc., vol. 51, No. 6, Jun. 2003.

(Continued)

*Primary Examiner* — Xu Mei

(57) ABSTRACT

Audio perception in local proximity to visual cues is provided. A device includes a video display, first row of audio transducers, and second row of audio transducers. The first and second rows can be vertically disposed above and below the video display. An audio transducer of the first row and an audio transducer of the second row form a column to produce, in concert, an audible signal. The perceived emanation of the audible signal is from a plane of the video display (e.g., a location of a visual cue) by weighing outputs of the audio transducers of the column In certain embodiments, the audio transducers are spaced farther apart at a periphery for increased fidelity in a center portion of the plane and less fidelity at the periphery.

9 Claims, 9 Drawing Sheets

(56) References Cited

U.S. PATENT DOCUMENTS

| | | | |
|---|---|---|---|
| 1,850,130 A | 3/1932 | Gannett | |
| 5,850,455 A | 12/1998 | Arnold | |
| 6,040,831 A | 3/2000 | Nishida | |
| 6,154,549 A | 11/2000 | Arnold | |
| 6,507,658 B1 | 1/2003 | Abel | |
| 7,106,881 B2 | 9/2006 | Backman | |
| 7,602,924 B2 * | 10/2009 | Kleen | 381/61 |
| 8,208,663 B2 * | 6/2012 | Jeong et al. | 381/306 |
| 8,295,516 B2 * | 10/2012 | Kondo et al. | 381/306 |
| 8,325,929 B2 | 12/2012 | Mundt | |
| 8,483,414 B2 * | 7/2013 | Kondo et al. | 381/306 |
| 2005/0047624 A1 | 3/2005 | Kleen | |
| 2006/0206221 A1 | 9/2006 | Metcalf | |
| 2007/0019831 A1 | 1/2007 | Usui | |
| 2007/0169555 A1 | 7/2007 | Gao | |
| 2008/0165992 A1 | 7/2008 | Kondo | |
| 2010/0094631 A1 | 4/2010 | Engdegard | |
| 2010/0119092 A1 * | 5/2010 | Kim et al. | 381/306 |
| 2011/0013790 A1 | 1/2011 | Engdegard | |
| 2011/0022402 A1 | 1/2011 | Engdegard | |
| 2011/0302230 A1 | 12/2011 | Ekstrand | |
| 2012/0195447 A1 * | 8/2012 | Hiruma et al. | 381/306 |

FOREIGN PATENT DOCUMENTS

| | | |
|---|---|---|
| JP | 02-059000 | 2/1990 |
| JP | 5-60049 | 8/1993 |
| JP | 06327090 | 11/1994 |
| JP | 2691185 | 12/1997 |
| JP | 2007-134939 | 5/2007 |
| JP | 2007-266967 | 10/2007 |
| JP | 4010161 | 11/2007 |
| JP | 2008-034979 | 2/2008 |
| JP | 2009-267745 | 11/2009 |
| WO | 2009116800 | 9/2009 |
| WO | 2010/125104 | 11/2010 |
| WO | 2011/039195 | 4/2011 |
| WO | 2011/048067 | 4/2011 |
| WO | 2011/061174 | 5/2011 |

OTHER PUBLICATIONS

Mayfield, Mark, "Localization of Sound to Image" A Conceptual Approach to a Closer-to-Reality Moviegoing Experience, 8 pages; Undated.

Lee, Taejin, et al., "A Personalized Preset-based Audio System for Interactive Service" AES Paper, presented at the 121st Convention, Oct. 5-8, 2006.

* cited by examiner

| Audio ID | Start Frame | Stop Frame | Widescreen Format Coordinate | Standard Format Coordinate | Size (inches) |
|---|---|---|---|---|---|
| 0001 | 0001 | 0009 | X1, Y1 | X2, Y2 | 2 |
| 0002 | 0005 | 0009 | X3, Y3 | X4, Y4 | 3 |

FIG. 7A

| Audio ID | Start Frame | Stop Frame | Widescreen Format Coordinate | | Standard Format: | | Size (inches) |
|---|---|---|---|---|---|---|---|
| | | | Start Location | End Location | Start Location | End Location | |
| 0001 | 0001 | 0009 | X1, Y1 | X2, Y2 | X3, Y3 | X4, Y4 | 2 |
| 0002 | 0005 | 0009 | X4, Y4 | X4, Y4 | X5, Y5 | X5, Y5 | 3 |

FIG. 7B

| Audio ID | Start Frame | Stop Frame | Widescreen Format Coordinate | | Standard Format: | | Size |
|---|---|---|---|---|---|---|---|
| | | | Start Location | End Location | Start Location | End Location | |
| 0001 | 0001 | 0009 | P1%, P2% | P3%, P4% | P5%, P6% | P7%, P8% | P17% |
| 0002 | 0005 | 0009 | P9%, P10% | P11%, P12% | P13%, P14% | P15%, P16% | P18% |

FIG. 7C

TECHNIQUES FOR LOCALIZED PERCEPTUAL AUDIO

CROSS REFERENCE TO RELATED APPLICATIONS

The present application is a continuation of, and claims the benefit of priority to, U.S. Nonprovisional patent application Ser. No. 13/425,249, filed Mar. 20, 2012, which is a continuation application filed under 35 U.S.C. 111(a) of International Patent Application No. PCT/US2011/028783, having international filing date of Mar. 17, 2011 and entitled "Techniques for Localized Perceptual Audio," which claims priority to U.S. Provisional Patent Application No. 61/316,579, filed Mar. 23, 2010 and entitled "Techniques for Localized Perceptual Audio." The contents of all of the above applications are incorporated by reference in their entirety for all purposes.

TECHNOLOGY

The present invention relates generally to audio reproduction and, in particular to, audio perception in local proximity with visual cues.

BACKGROUND

Fidelity sound systems, whether in a residential living room or a theatrical venue, approximate an actual original sound field by employing stereophonic techniques. These systems use at least two presentation channels (e.g., left and right channels, surround sound 5.1, 6.1, or 11.1, or the like), typically projected by a symmetrical arrangement of loudspeakers. For example, as shown in FIG. 1, a conventional surround sound 5.1 system 100 includes: (1) front left speaker 102, (2) front right speaker 104, (3) front center speaker 106 (center channel), (4) low frequency speaker 108 (e.g., subwoofer), (5) back left speaker 110 (e.g., left surround), and (6) back right speaker 112 (e.g., right surround). In system 100, front center speaker 106, or a single center channel, carries all dialog and other audio associated with on-screen images.

However, these systems suffer from imperfections, especially in localizing sounds in some directions, and often require a fixed single listener position for best performance (e.g., sweet spot 114, a focal point between loudspeakers where an individual hears an audio mix as intended by the mixer). Many efforts for improvement to date involve increases in the number of presentation channels. Mixing a larger number of channels incurs larger time and cost penalties on content producers, and yet the resulting perception fails to localize sound in proximity to a visual cue of sound origin. In other words, reproduced sounds from these sound systems are not perceived to emanate from a video on-screen plane, and thus fall short of true realism.

From the above, it is appreciated by the inventors that techniques for localized perceptual audio associated with a video image is desirable for an improved natural hearing experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY OF THE DESCRIPTION

Methods and apparatuses for audio perception in local proximity to visual cues are provided. An audio signal, either analog or digital, is received. A location on a video plane for perceptual origin of the audio signal is determined, or otherwise provided. A column of audio transducers (for example, loudspeakers) corresponding to a horizontal position of the perceptual origin is selected. The column includes at least two audio transducers selected from rows (e.g., 2, 3, or more rows) of audio transducers. Weight factors for "panning" (e.g., generation of phantom audio images between physical loudspeaker locations) are determined for the at least two audio transducer of the column. Theses weights factors correspond to a vertical position of the perceptual origin. An audible signal is presented by the column utilizing the weight factors.

In an embodiment of the present invention, a device includes a video display, first row of audio transducers, and second row of audio transducers. The first and second rows are vertically disposed above and below the video display. An audio transducer of the first row and an audio transducer of the second row form a column to produce, in concert, an audible signal. The perceived emanation of the audible signal is from a plane of the video display (e.g., a location of a visual cue) by weighing outputs of the audio transducers of the column. In certain embodiments, the audio transducers are spaced farther apart at a periphery for increased fidelity in a center portion of the plane and less fidelity at the periphery.

In another embodiment, a system includes an audio transparent screen, first row of audio transducers, and second row of audio transducers. The first and second rows are disposed behind (relative to expected viewer/listener position) the audio transparent screen. The screen is audio transparent for at least a desirable frequency range of human hearing. In specific embodiments, the system can further include a third, fourth, or more rows of audio transducers. For example, in a cinema venue, three rows of 9 transducers can provide a reasonable trade-off between performance and complexity (cost).

In yet another embodiment of the present invention, metadata is received. The metadata includes a location for perceptual origin of an audio stem (e.g., submixes, subgroups, or busses that can be processed separately prior to combining into a master mix). One or more columns of audio transducers in closest proximity to a horizontal position of the perceptual origin are selected. Each of the one or more columns includes at least two audio transducers selected from rows of audio transducers. Weight factors for the at least two audio transducer are determined. These weights factors are correlated with, or otherwise related to, a vertical position of the perceptual origin. The audio stem is audibly presented by the column utilizing the weight factors.

As embodiment of the present invention, an audio signal is received. A first location on a video plane for the audio signal is determined This first location corresponds to a visual cue on a first frame. A second location on the video plane for the audio signal is determined The second location corresponds to the visual cue on a second frame. A third location on the video plane for the audio signal is interpolated, or otherwise estimated, to correspond to positioning of the visual cue on a third frame. The third location is disposed between the first and second locations, and the third frame intervenes the first and second frames.

BRIEF DESCRIPTION OF DRAWINGS

The present invention is illustrated by way of example, and not by way of limitation, in the figures of the accompanying drawings and in which like reference numerals refer to similar elements and in which:

FIGS. 7A, 7B, and 7C shows exemplary metadata information for localized perceptual audio according to embodiment of the present invention;

DETAILED DESCRIPTION OF EXAMPLE POSSIBLE EMBODIMENTS

Figure 2:
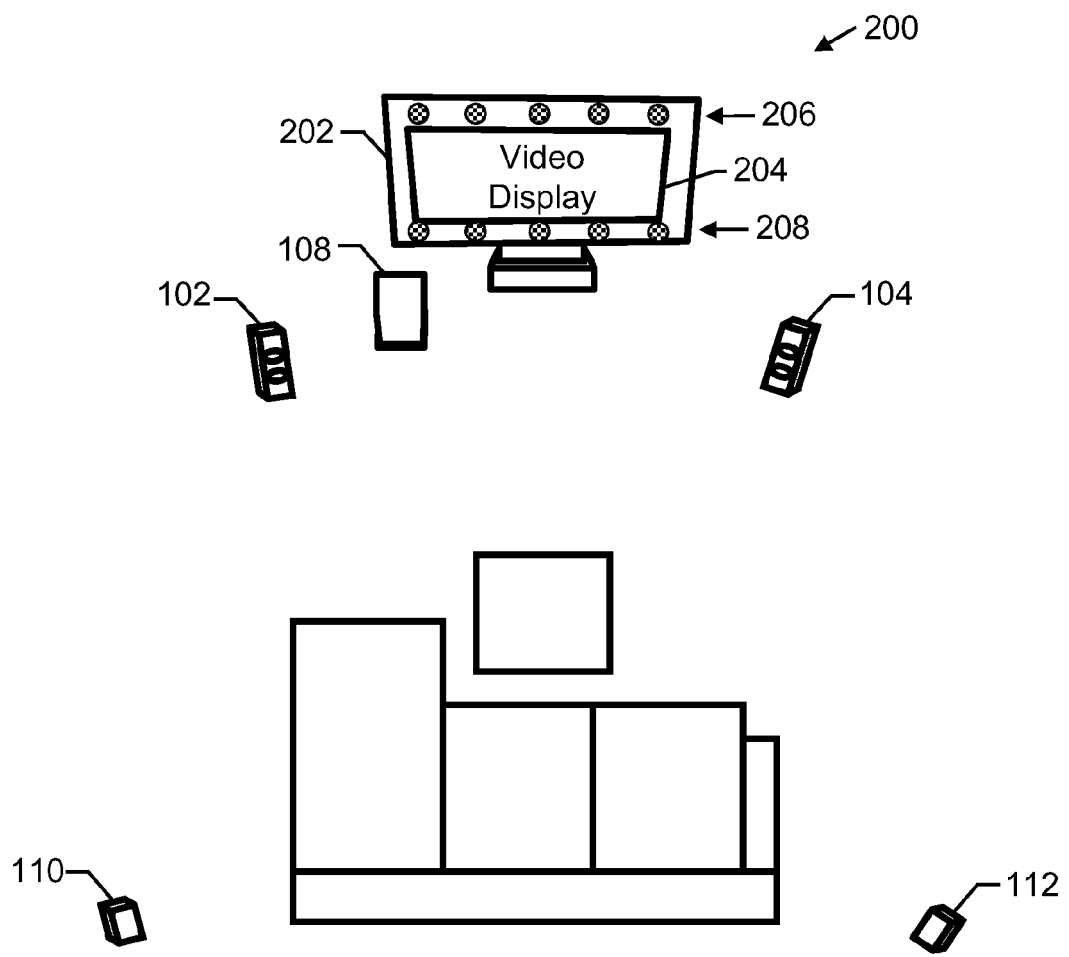
FIG. 2 illustrates an exemplary system according to an embodiment of the present invention.

FIG. 2 illustrates an exemplary system 200 according to an embodiment of the present invention. System 200 includes a video display device 202, which further includes a video screen 204 and two rows 206, 208 of audio transducers. The rows 206, 208 are vertically disposed about video screen 204 (e.g., row 206 positioned above and row 208 positioned below video screen 204). In a specific embodiment, rows 206, 208 replace front center speaker 106 to output a center channel audio signal in a surround sound environment. Accordingly, system 200 can further include, but not necessarily, one or more of the following: front left speaker 102, front right speaker 104, low frequency speaker 108, back left speaker 110, and back right speaker 112. The center channel audio signal can be dedicated, completely or partly, to reproduction of speech segments or other dialogue stems of the media content.

Each row 206, 208 includes a plurality of audio transducers—2, 3, 4, 5 or more audio transducers. These audio transducers are aligned to form columns—2, 3, 4, 5 or more columns Two rows of 5 transducers each provide a sensible trade-off between performance and complexity (cost). In alternative embodiments, the number of transducers in each row may differ and/or placement of transducers can be skewed. Feeds to each audio transducer can be individualized based on signal processing and real-time monitoring to obtain, among other things, desirable perceptual origin, source size and source motion.

Audio transducers can be any of the following: loudspeakers (e.g., a direct radiating electro-dynamic driver mounted in an enclosure), horn loudspeakers, piezoelectric speakers, magnetostrictive speakers, electrostatic loudspeakers, ribbon and planar magnetic loudspeakers, bending wave loudspeakers, flat panel loudspeakers, distributed mode loudspeakers, Heil air motion transducers, plasma arc speakers, digital speakers, distributed mode loudspeakers (e.g., operation by bending-panel-vibration—see as example U.S. Pat. No. 7,106,881, which is incorporated herein in its entirety for all purposes), and any combination/mix thereof. Similarly, the frequency range and fidelity of transducers can, when desirable, vary between and within rows. For example, row 206 can include audio transducers that are full range (e.g., 3 to 8 inches diameter driver) or mid-range, as well high frequency tweeters. Columns formed by rows 206, 208 can by design to include differing audio transducers to collectively provide a robust audible output.

Figure 1:
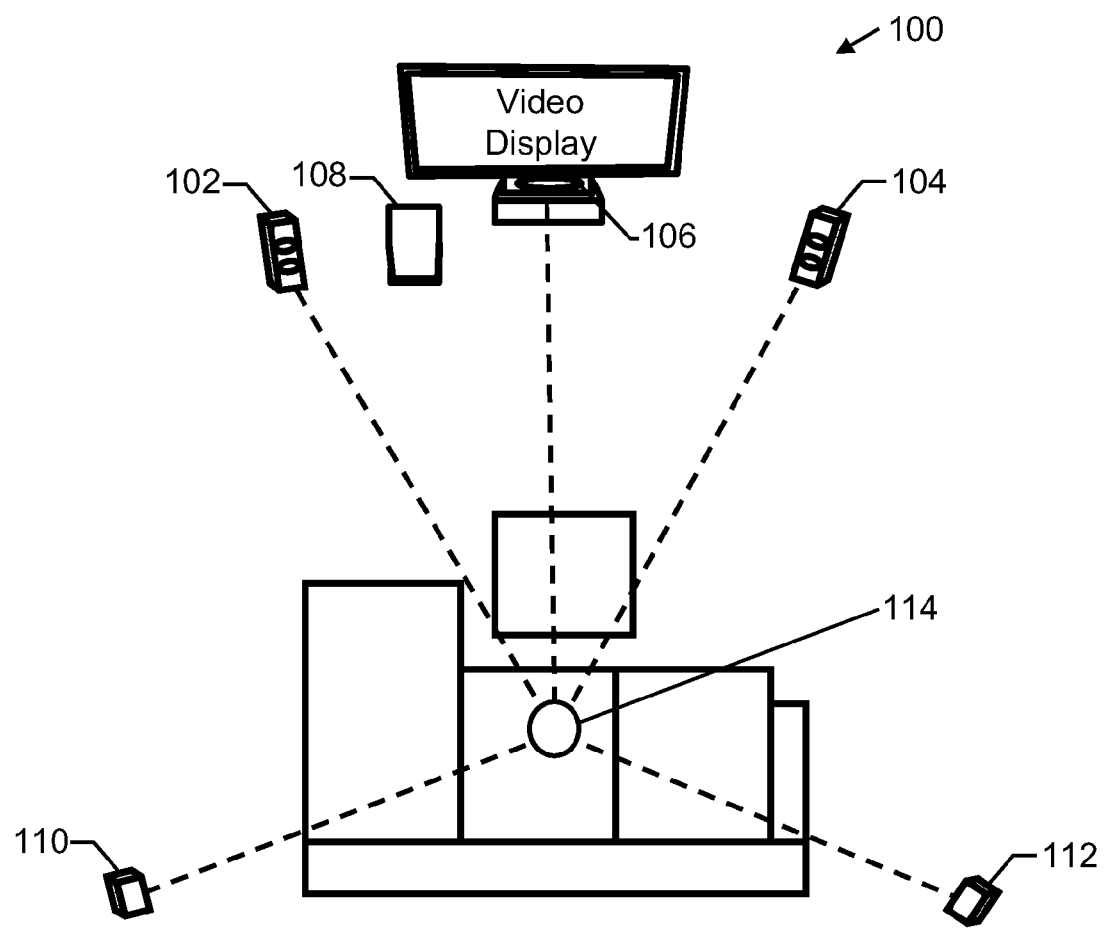
FIG. 1 illustrates a conventional surround sound 5.1 system.
Figure 3:
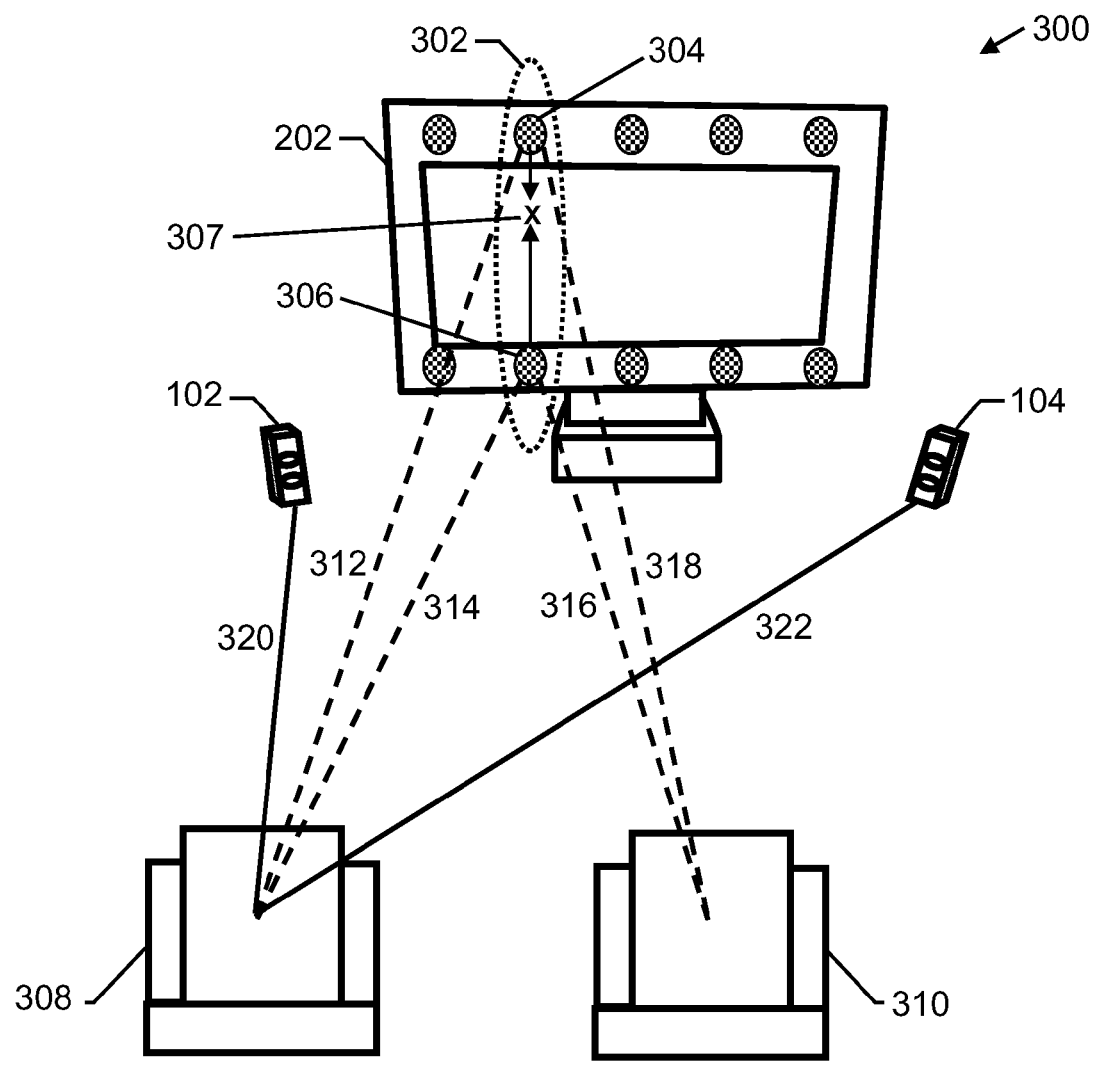
FIG. 3 illustrates listening position insensitivity of an embodiment of the present invention.

FIG. 3 illustrates listening position insensitivity of display device 202, among other features, as compared to sweet spot 114 of FIG. 1. Display device 202 avoids, or otherwise mitigates, for a center channel:

(i) timbre impairment—primarily a consequence of combing, a result of differing propagation times between a listener and loudspeakers at respectively different distances;

(ii) incoherence—primarily a consequence in differing velocity end energy vectors associated with a wavefront simulated by multiple sources, causing an audio image to be either indistinct (e.g., acoustically blurry) or perceived at each loudspeaker position instead of a single audio image at an intermediate position; and (iii) instability—a variation of audio image location with listener position, for example, an audio image will move, or even collapse, to the nearer loudspeaker when the listener moves outside a sweet spot. Display device 202 employs at least one column for audio presentation, or hereinafter sometimes referred to as "column snapping," for improved spatial resolution of audio image position and size, and to improve integration of the audio to an associated visual scene.

In this example, column 302, which includes audio transducers 304 and 306, presents a phantom audible signal at location 307. The audible signal is column snapped to location 307 irrespective of a listener's lateral position, for example, listener positions 308 or 310. From listener position 308, path lengths 312 and 314 are substantially equal. This holds true, as well, for listener position 310 with path lengths 316 and 318. In other words, despite any lateral change in listener position, neither audio transducer 302 or 304 moves relatively closer to the listener than the other in column 302. In contrast, paths 320 and 322 for front left speaker 102 and front right speaker 104, respectively, can vary greatly and still suffer from listener position sensitivities.

Figure 4A:
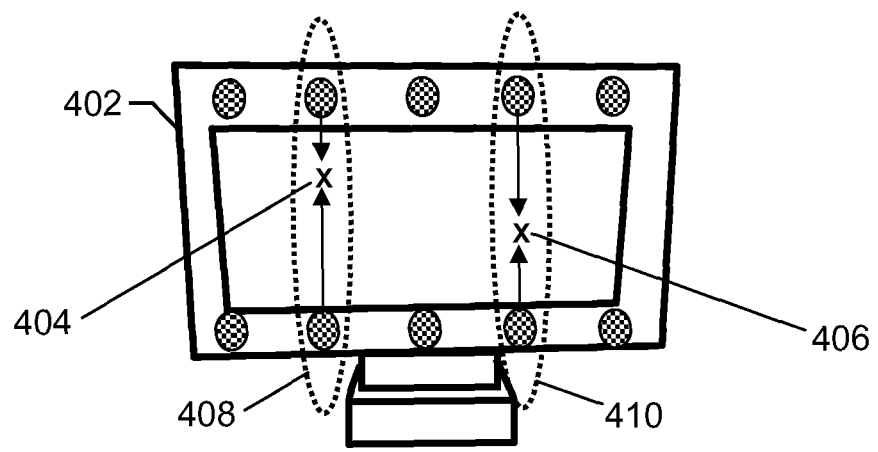
FIGS. 4A and 4B are simplified diagrams illustrating perceptual sound positioning according to embodiments of the present invention.
Figure 4B:
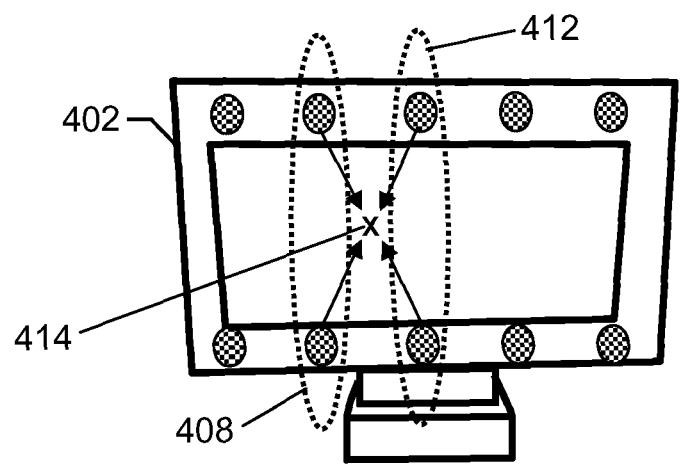

FIGS. 4A and 4B are simplified diagrams illustrating perceptual sound positioning for device 402, according to embodiments of the present invention. In FIG. 4A, device 402 outputs a perceptual sound at position 404, and then jumps to position 406. The jump can be associated with a cinematic cutaway or change in sound source within the same scene (e.g., different speaking actor, sound effect, etc.). This can be accomplished in the horizontal direction by first column snapping to column 408, and then to column 410. Vertical positioning is accomplished by varying the relative panning weights between audio transducers within the snapped column. Additionally, device 402 can also output two distinct, localized sounds at position 404 and position 406 simultaneously using both columns 408 and 410. This is desirable if multiple visual cues are present on screen. As a specific embodiment, multiple visual cues can be coupled with the use of picture-in-picture (PiP) displays to spatially associate sounds with an appropriate picture during simultaneous display of multiple programs.

In FIG. 4B, device 402 outputs a perceptual sound at position 414, an intermediate position disposed between columns 408 and 412. In this case, two columns are used to position the perceptual sound. It should be understood that audio transducers can be individually controlled across a listening area for the desired effect. As discussed above, an audio image can be placed anywhere on the video screen display, for example by column snapping. The audio image can be either a point source or a large area source, depending on the visual cue. For example, dialogue can be perceived to emanate from the actor's mouth on the screen, while a sound of waves crashing on a beach can spread across an entire width of the screen. In that example, the dialogue can be column snapped, while, at the same time, an entire row of transducers are used to sound the waves. These effects will be perceived similarly for all listener positions. Furthermore, the perceived sound source can travel on the screen as necessary (e.g., as the actor moves on the screen).

Figure 5:
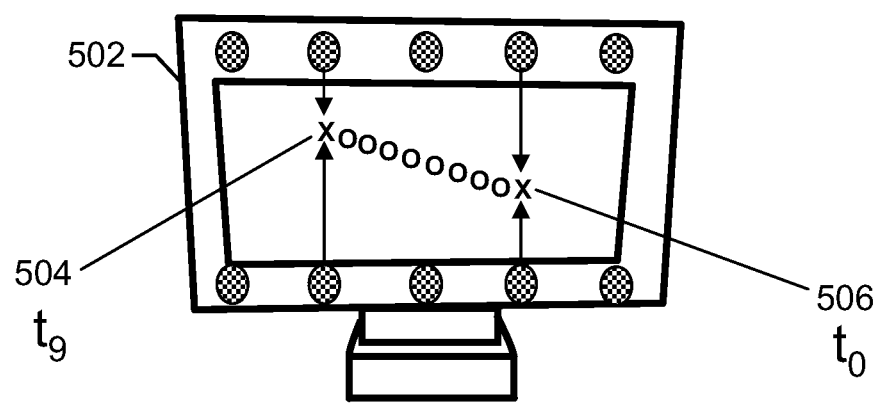
FIG. 5 is a simplified diagram illustrating interpolation of perceptual sound positioning for motion according to an embodiment of the present invention.

FIG. 5 is a simplified diagram illustrating interpolation of perceptual sound positioning for motion by device 502, according to an embodiment of the present invention. This positional interpolation can occur either at time of mixing, encoding, decoding, or post-processing playback, and then the computed, interpolated positions (e.g., x, y coordinate position on display screen) can be used for audio presentation as described herein. For example, at a time $t_0$, an audio stem can be designated to be located at start position 506. Start position 506 can correspond to a visual cue or other source of the audio stem (e.g., actor's mouth, barking dog, car engine, muzzle of a firearm, etc.). At a later time $t_9$ (9 frames later), the same visual cue or other source can be designated to be located at end position 504, preferably before a cutaway scene. In this example, frames at time $t_9$ and time $t_0$ are "key frames." Given the start position, end position, and elapsed time, an estimated position of the moving source can be linearly interpolated for each intervening frame, or non-key frames, to be used in audio presentation. Metadata associated with the scene can include (i) start position, end position, and elapsed time, (ii) interpolated positions, or (iii) both items (i) and (ii).

In alternative embodiments, interpolation can be parabolic, piecewise constant, polynomial, spline, or Gaussian process. For example, if the audio source is a discharged bullet, then a ballistic trajectory, rather than linear, can be employed to more closely match the visual path. In some instances, it can be desirable to use panning in a direction of travel for smooth motion, while "snapping" to the nearest row or column in the direction perpendicular to motion to decrease phantom image impairments, and thus the interpolation function can be accordingly adjusted. In other instances, additional positions beyond designated end position 504 can be computed by extrapolation, particularly for brief time periods.

Designation of start position 506 and end position 504 can be accomplished by a number of methods. Designation can be performed manually by a mix operator. Time varying, manual designation provides accuracy and superior control in audio presentation. However, it is labor intensive, particularly if a video scene includes multiple sources or stems.

Designation can also be performed automatically using artificial intelligence (such as, neural networks, classifiers, statistical learning, or pattern matching), object/facial recognition, feature extraction, and the like. For example, if it is determined that an audio stem exhibits characteristics of a human voice, it can be automatically associated with a face found in the scene by facial recognition techniques. Similarly, if an audio stem exhibits characteristics of particular musical instrument (e.g., violin, piano, etc.), then the scene can be searched for an appropriate instrument and assigned a corresponding location. In the case of an orchestra scene, automatic assignment of each instrument can clearly be labor saving over manual designation.

Another designation method is to provide multiple audio streams that each capture the entire scene for different known positions. The relative level of the scene signals, optimally with consideration of each audio object signal, can be analyzed to generate positional metadata for each audio object signal. For example, a stereo microphone pair could be used to capture the audio across a sound stage. The relative level of the actor's voice in each microphone of the stereo microphone can be used to estimate the actor's position on stage. In the case of computer-generated imagery (CGI) or computer-based games, positions of audio and video objects in an entire scene are known, and can be directly used to generate audio image size, shape and position metadata.

Figure 6A:
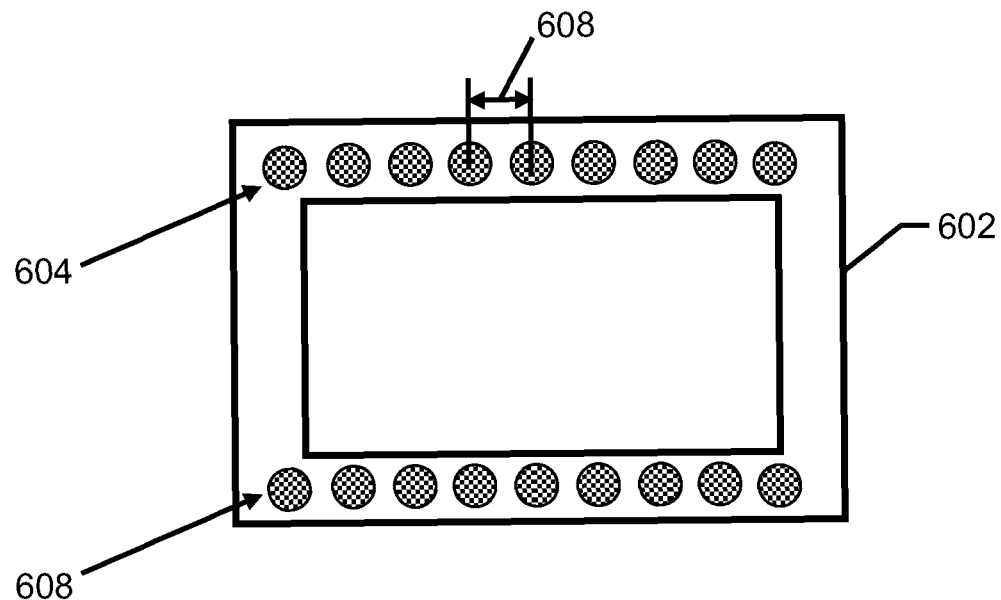
FIGS. 6A, 6B, 6C, and 6D illustrate exemplary device configurations according to embodiments of the present invention.

FIGS. 6A, 6B, 6C, and 6D illustrate exemplary device configurations according to embodiments of the present invention. FIG. 6A shows a device 602 with densely spaced transducers in two rows 604, 606. The high density of transducer improved spatial resolution of audio image position and size, as well as increased granular motion interpolation. In a specific embodiment, adjacent transducers are spaced less than 10 inches apart (center-to-center distance 608), or about less than about 6° degree for a typical listening distance of about 8 feet. However, it should be appreciated that for higher density, adjacent transducers can abut and/or loudspeaker cone size reduced. A plurality of micro-speakers (e.g., Sony DAV-IS10; Panasonic Electronic Device; 2×1 inch speakers or smaller, and the like) can be employed.

Figure 6B:
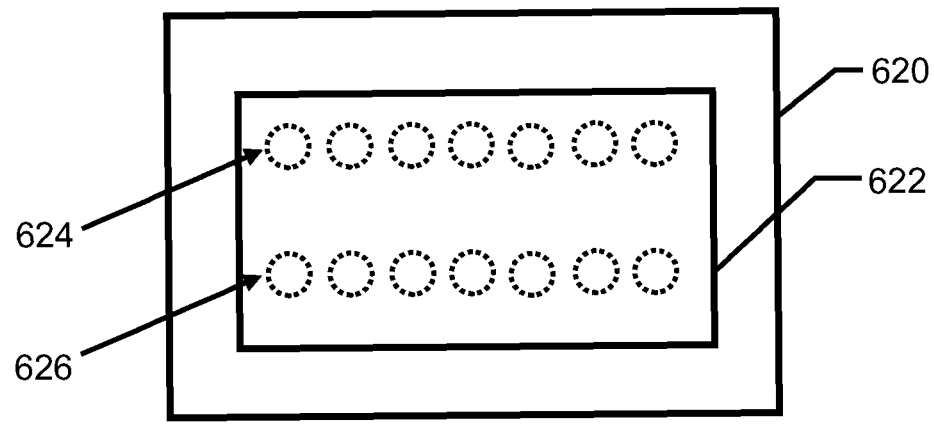

In FIG. 6B, a device 620 includes an audio transparent screen 622, first row 624 of audio transducers, and second row 626 of audio transducers. The first and second rows are disposed behind (relative to expected viewer/listener position) the audio transparent screen. The audio transparent screen can be, without limitation, a projection screen, silver screen, television display screen, cellular radiotelephone screen (including touch screen), laptop computer display, or desktop/flat panel computer display. The screen is audio transparent for at least a desirable frequency range of human hearing, preferably about 20 Hz to about 20 kHz, or more preferably an entire range of human hearing.

In specific embodiments, device 620 can further include third, fourth, or more rows (not shown) of audio transducers. In such cases, the uppermost and bottommost rows are preferably, but not necessarily, located respectively in proximity to the top and bottom edges of the audio transparent screen. This allows audio panning to the full extent on the display screen plane. Furthermore, distances between rows may vary to provide greater vertical resolution in one portion, at an expense of another portion. Similarly, audio transducers in one or more of the rows can be spaced farther apart at a periphery for increased horizontal resolution in a center portion of the plane and less resolution at the periphery. High density of audio transducers in one or more areas (as determined by combination of row and individual transducer spacing) can be configured for higher resolution, and low density for lower resolution in others.

Figure 6C:
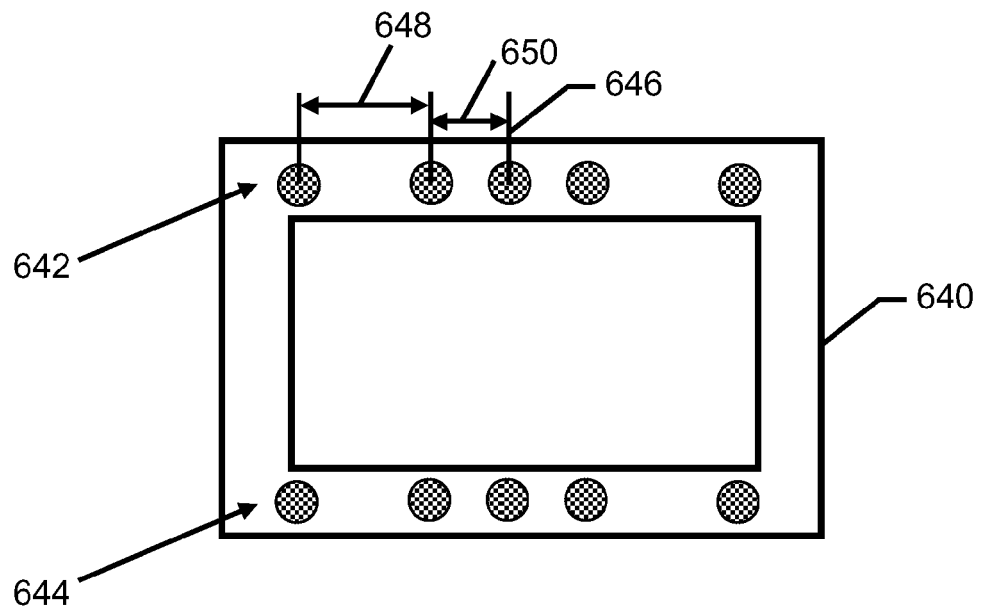

Device 640, in FIG. 6C, also includes two rows 642, 644 of audio transducers. In this embodiment, distances between audio transducers within a row vary. Distances between adjacent audio transducers can vary as a function from centerline 646, whether linear, geometric, or otherwise. As shown, distance 648 is greater than distance 650. In this way, spatial resolution on the display screen plan can differ. Spatial resolution in a first portion (e.g., a center portion) can be increased at the expense of lower spatial resolution in a second portion (e.g., a periphery portion). This can be desirable as a majority of visual cues for dialogue presented in a surround system center channel occurs in about the center of the screen plane.

Figure 6D:
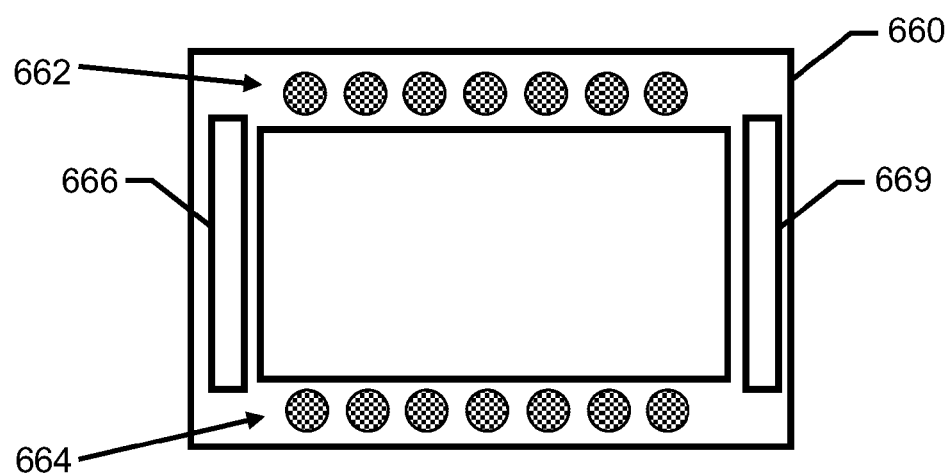

FIG. 6D illustrates an exemplary form factor for device 660. Rows 662, 664 of audio transducers, providing a high resolution center channel, are integrated into a single form factor, as well as left front loudspeaker 666 and right front loudspeaker 668. Integration of these components into a single form factor can provide assembly efficiencies, better reliability, and improved aesthetics. However, in some instances, rows 662 and 664 can be assembled as separate sound bars and each physically coupled (e.g., mounted) to a display device. Similarly, each audio transducer can be individually packaged and coupled to a display device. In fact, a position of each audio transducer can be end-user adjustable to alternative, pre-defined locations depending on end-user preferences. For example, transducers are mounted on a track with available slotted positions. In such scenario, final positions of the transducers are inputted by user, or automatically detected, into a playback device for appropriate operation of localized perceptual audio.

FIGS. 7A, 7B, and 7C show types of metadata information for localized perceptual audio according to embodiments of the present invention. In a simple example of FIG. 7A, metadata information includes a unique identifier, timing information (e.g., start and stop frame, or alternatively elapsed time), coordinates for audio reproduction, and desirable size of audio reproduction. Coordinates can be provided for one or more conventional video formats or aspect ratios, such as widescreen (greater than 1.37:1), standard (4:3), ISO 216 (1.414), 35 mm (3:2), WXGA (1.618), Super 16 mm (5:3), HDTV (16:9) and the like. Size of audio reproductions, which can be correlated with the size of the visual cue, is provided to allow presentation by multiple transducer columns for increased perceptual size.

The metadata information provided in FIG. 7B differs from FIG. 7A in that audio signals can be identified for motion interpolation. Start and end locations for an audio signal are provided. For example, audio signal 0001 starts at X1, Y2 and moves to X2, Y2 during frame sequence 0001 to 0009. In a specific embodiment, metadata information can further include an algorithm or function to be used for motion interpolation.

In FIG. 7C, metadata information similar to the example shown by FIG. 7B is provided. However, in this example, reproduction location information is provided as a percentage of display screen dimension(s) in lieu of Cartesian x-y coordinates. This affords device independence of the metadata information. For example, audio signal 0001 starts at P1% (horizontal), P2% (vertical). P1% can be 50% of display length from a reference point, and P2% can 25% of display height from the same or another reference point. Alternatively, location of sound reproduction can be specified by distance (e.g., radius) and angle from a reference point. Similarly, size of reproduction can be expressed as a percentage of a display dimension or reference value. If a reference value is used, the reference value can be provided as metadata information to the playback device, or it can be predefined and stored on the playback device if device dependent.

Besides the above types of metadata information (location, size, etc.), other desirable types can include:
 a. audio shape;
 b. virtual versus true image preference;
 c. desired absolute spatial resolution (to help manage phantom versus true audio imaging during playback)—resolution could be specified for each dimension (e.g. L/R, front/back); and
 d. desired relative spatial resolution (to help manage phantom versus vs true audio imaging during playback)—resolution could be specified for each dimension (e.g. L/R, front/back). Additionally, for each signal to a center channel audio transducer or a surround system loudspeaker, metadata can be transmitted indicating an offset. For example, metadata can indicate more precisely (horizontally and vertically) the desired position for each channel to be rendered. This would allow course, but backward compatible, spatial audio to be transmitted with higher resolution rendering for systems with higher spatial resolution.

Figure 8:
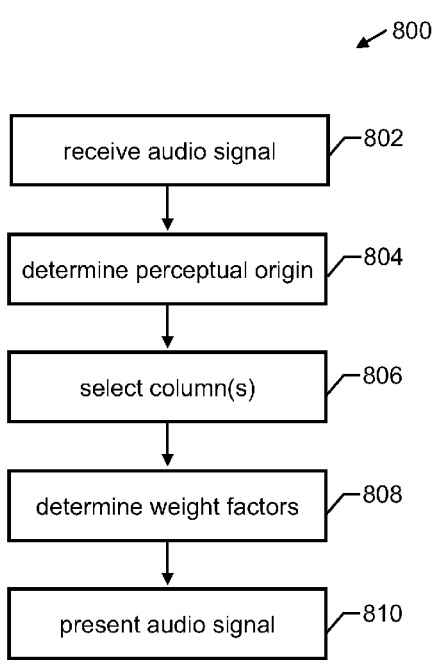
FIG. 8 illustrates a simplified flow diagram according to an embodiment of the present invention.

FIG. 8 illustrates a simplified flow diagram 800 according to an embodiment of the present invention. In step 802, an audio signal is received. A location on a video plane for perceptual origin of the audio signal is determined in step 804. Next, in step 806, one or more columns of audio transducers are selected. The selected columns correspond to a horizontal position of the perceptual origin. Each of the columns includes at least two audio transducers. Weight factors for the at least two audio transducer are determined or otherwise computed in step 808. The weights factors correspond to a vertical position of the perceptual origin for audio panning Finally, in step 810, an audible signal is presented by the column utilizing the weight factors. Other alternatives can also be provided where steps are added, one or more steps are removed, or one or more steps are provided in a different sequence from above without departing from the scope of the claims herein.

Figure 9:
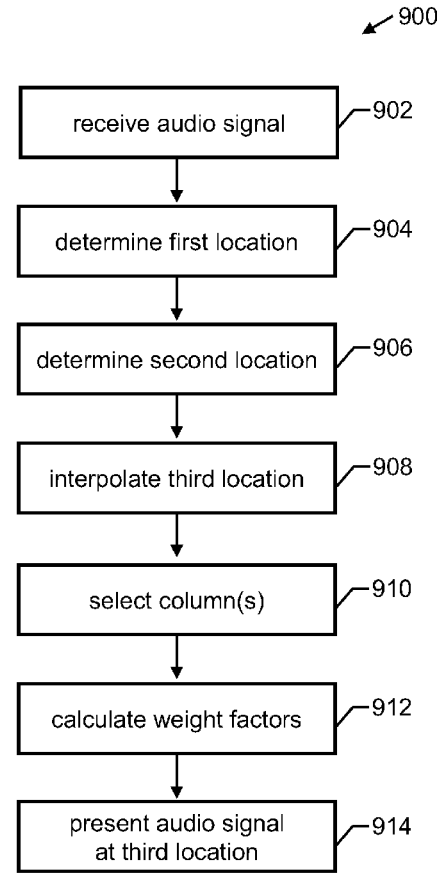
FIG. 9 illustrates another simplified flow diagram according to an embodiment of the present invention.

FIG. 9 illustrates a simplified flow diagram 900 according to an embodiment of the present invention. In step 902, an audio signal is received. A first location on a video plane for an audio signal is determined or otherwise identified in step 904. The first location corresponds to a visual cue on a first frame. Next, in step 906, a second location on the video plane for the audio signal is determined or otherwise identified. The second location corresponds to the visual cue on a second frame. For step 908, a third location on the video plane is calculated for the audio signal. The third location is interpolated to correspond to positioning of the visual cue on a third frame. The third location is disposed between the first and second locations, and the third frame intervenes between the first and second frames.

The flow diagram further, and optionally, includes steps 910 and 912 to select a column of audio transducers and calculate weight factors, respectively. The selected column corresponds to a horizontal position of the third location, and the weight factors corresponding to a vertical position of same. In step 914, an audible signal is optionally presented by the column utilizing the weight factors during display of the third frame. Flow diagram 900 can be performed, wholly or in part, during media production by a mixer to generate requisite metadata or during playback for audio presentation. Other alternatives can also be provided where steps are added, one or more steps are removed, or one or more steps are provided in a different sequence from above without departing from the scope of the claims herein.

The above techniques for localized perceptual audio can be extended to three dimensional (3D) video, for example stereoscopic image pairs: a left eye perspective image and a right eye perspective image. However, identifying a visual cue in only one perspective image for key frames can result in a horizontal discrepancy between positions of the visual cue in a final stereoscopic image and perceived audio playback. In order to compensate, stereo disparity can be estimated and an adjusted coordinate can be automatically determined using conventional techniques, such as correlating a visual neighborhood in a key frame to the other perspective image or computed from a 3D depth map.

Stereo correlation can also be used to automatically generate an additional coordinate, z, directed along the normal to the display screen and corresponding to the depth of the sound image. The z coordinate can be normalized so that one is directly at the viewing location, zero indicates on the display screen plane, and less than 0 indicates a location behind the plane. At playback time, the additional depth coordinate can be used to synthesize additional immersive audio effects in combination to the stereoscopic visuals.

Implementation Mechanisms-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. The techniques are not limited to any specific combination of hardware circuitry and software, nor to any particular source for the instructions executed by a computing device or data processing system.

The term "storage media" as used herein refers to any media that store data and/or instructions that cause a machine to operation in a specific fashion. It is non-transitory. Such storage media may comprise non-volatile media and/or volatile media. Non-volatile media includes, for example, optical or magnetic disks. Volatile media includes dynamic memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

Equivalents, Extensions, Alternatives, and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. It should be further understood, for clarity, that exempli gratia (e.g.) means "for the sake of example" (not exhaustive), which differs from id est (i.e.) or "that is." Additionally, in the foregoing description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention.

We claim:

1. A video display apparatus, the apparatus comprising:
 a video display;
 a first row of at least five audio transducers above the video display, the audio transducers of the first row being spaced farther apart at a periphery of the first row; and
 a second row of at least five audio transducers below the video display, the audio transducers of the second row being spaced farther apart at a periphery of the second row,
 wherein a first audio transducer of the first row and a first audio transducer of the second rows form a first column to concertedly produce an first audible signal, the first audible signal being weighted between the audio transducers of the first column to correspond to a first visual cue position,
 wherein a second audio transducer of the first row and a second audio transducer of the second rows form a second column to concertedly produce a second audible signal during simultaneous reproduction of the first audible sound by the first column, the second audible signal being weighted between the audio transducer of the second column to correspond to a second visual cue position.

2. The apparatus of claim 1 wherein the video display, first row and second row are integrated with a single form factor.

3. The apparatus of claim 1 further comprising an input for receiving a center channel audio signal for a surround sound system,
 wherein the first and second rows only reproduce the center channel audio signal.

4. The apparatus of claim 1 further comprising a processor to calculate weights for the audio transducers of the first column for the first audible signal from metadata indicating the first visual cue position.

5. The apparatus of claim 1 further comprising a first surround loudspeaker and a second surround loudspeaker.

6. The apparatus of claim 1 wherein the first row of the at least five audio transducers comprises audio transducers of differing size.

7. The apparatus of claim 1 wherein the first row of the at least five audio transducers comprises audio transducers having differing frequency range performance.

8. The apparatus of claim 1 wherein the first and second visual cue positions are associated with different programs of media content.

9. The apparatus of claim 8 the second visual cue position is within a picture-in-picture.

* * * * *

UNITED STATES PATENT AND TRADEMARK OFFICE
CERTIFICATE OF CORRECTION

PATENT NO. : 8,755,543 B2
APPLICATION NO. : 13/892507
DATED : June 17, 2014
INVENTOR(S) : Christophe Chabanne, Charles Q. Robinson and Nicolas R. Tsingos It is certified that error appears in the above-identified patent and that said Letters Patent is hereby corrected as shown below:

In the Claims

In claim 1, beginning column 10, line 28,

"audio transducer of the second [[rows]] from a first column" should read
--audio transducer of the second row from a first column--

In claim 1, column 10, line 29,

"to concertedly produce [[an]] first audible signal, the first" should read
--to concertedly produce a first audible signal, the first--

In claim 1, column 10, line 34,

"second audio transducer of the second [[rows]] form a second" should read
--second audio transducer of the second row form a second--

In claim 1, column 10, line 37,

"audible [[sound]] by the first column, the second audible" should read
--audible signal by the first column, the second audible--

Signed and Sealed this
Thirtieth Day of September, 2014

Michelle K. Lee
*Deputy Director of the United States Patent and Trademark Office*